(12) United States Patent
Jo et al.

(10) Patent No.: US 8,582,059 B2
(45) Date of Patent: Nov. 12, 2013

(54) DISPLAY PANEL (75) Inventors: Youngeun Jo, Seoul (KR); Kyoungju Shin, Hwaseong-si (KR); Nakcho Choi, Seoul (KR); Sangil Kim, Yogin-si (KR); Chongchul Chai, Seoul (KR); Meehye Jung, Suwon-si (KR); Hee-Keun Lee, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 454 days.

(21) Appl. No.: 12/853,976

(22) Filed: Aug. 10, 2010

(65) Prior Publication Data
US 2011/0216259 A1  Sep. 8, 2011

(30) Foreign Application Priority Data

Mar. 5, 2010  (KR) .......................... 10-2010-0019731

(51) Int. Cl.
*G02F 1/1333* (2006.01)
(52) U.S. Cl.
USPC .................................. 349/85; 349/38; 349/42
(58) Field of Classification Search
USPC ............................................................ 349/85
See application file for complete search history.

(56) References Cited

U.S. PATENT DOCUMENTS

| 4,690,509 | A | * | 9/1987 | Bohmer | 345/89 |
| 4,840,460 | A | * | 6/1989 | Bernot et al. | 349/144 |
| 5,126,865 | A | * | 6/1992 | Sarma | 349/85 |
| 5,319,480 | A | * | 6/1994 | McCartney | 349/85 |
| 5,576,858 | A | * | 11/1996 | Ukai et al. | 349/42 |

FOREIGN PATENT DOCUMENTS

| JP | 09-236798 | 9/1997 |
| JP | 2004-062146 | 2/2004 |
| KR | 1020080042569 | 5/2008 |
| KR | 1020090063278 | 6/2009 |

* cited by examiner

*Primary Examiner* — Michelle R Connelly
(74) *Attorney, Agent, or Firm* — H.C. Park & Associates, PLC (57) ABSTRACT

A display panel includes a first substrate, a second substrate facing the first substrate, and a liquid crystal layer. The first substrate includes a plurality of pixels, each having at least one gray scale expression unit to express at least two gray scales. The liquid crystal layer is interposed between the first and second substrates and subject to a phase transition depending on a voltage generated in relation to the gray scale expression unit. The gray scale expression unit includes a data line, a gate line crossing the data line and insulated from the data line, a switching device connected to the data line and the gate line, a first pixel electrode connected to the switching device, at least one coupling capacitor connected to the first pixel electrode in parallel, and at least one second pixel electrode connected to the first pixel electrode in parallel through the coupling capacitor.

17 Claims, 11 Drawing Sheets

DISPLAY PANEL

CROSS REFERENCE TO RELATED APPLICATION

This application claims priority from and the benefit of Korean Patent Application No. 2010-0019731, filed on Mar. 5, 2010, which is hereby incorporated by reference for all purposes as if fully set forth herein.

BACKGROUND OF THE INVENTION

1. Field of the Invention

Exemplary embodiments of the present invention relate to a display panel. More particularly, exemplary embodiments of the present invention relate to a display panel with improved display characteristics.

2. Discussion of the Background

Liquid crystal displays (LCDs) are extensively used in flat display apparatuses and typically include a liquid crystal display panel having a first substrate, a second substrate, and a liquid crystal layer interposed between the first and second substrates.

A nematic liquid crystal is generally used in the liquid crystal layer. Recently, a cholesteric liquid crystal or a bistable liquid crystal that provides a wide viewing angle, a high response speed, and a high contrast ratio has been developed.

In contrast to the nematic liquid crystal, both the cholesteric liquid crystal and the bistable liquid crystal express only two gray scales, so the time division scheme or the spatial division scheme may be adopted to express three gray scales or more. However, when the spatial division scheme is adopted, many transistors are required to express many gray scales so that a pixel area is enlarged. Thus, the resolution of the display apparatus may be degraded even though the number of expressed gray scales can be increased.

SUMMARY OF THE INVENTION

Exemplary embodiments of the present invention provide a display panel capable of improving display characteristics thereof.

Exemplary embodiments of the present invention also provide a display panel apparatus, driven through the spatial division scheme, with a reduced number of transistors used to express the many gray scales without degraded resolution.

Additional features of the invention will be set forth in the description which follows, and in part will be apparent from the description, or may be learned by practice of the invention.

An exemplary embodiment of the present invention discloses a display panel that comprises a first substrate comprising a plurality of pixels, each of the pixels comprising at least is one gray scale expression unit to express at least two gray scales; a second substrate facing the first substrate; and a liquid crystal layer interposed between the first substrate and the second substrate and subject to a phase transition depending on a voltage generated in relation to the gray scale expression unit. The gray scale expression unit comprises a data line; a gate line crossing the data line and insulated from the data line; a switching device connected to the data line and the gate line; a first pixel electrode connected to the switching device; at least one coupling capacitor connected to the first pixel electrode in parallel; and at least one second pixel electrode connected to the first pixel electrode in parallel through the coupling capacitor.

An exemplary embodiment of the present invention also discloses a display panel that comprises a first substrate comprising a plurality of pixels; a second substrate facing the first substrate; and a liquid crystal layer interposed between the first substrate and the second substrate and subject to a phase transition depending on a voltage generated in relation to the pixels. Each pixel comprises a first data line and a second data line; a gate line crossing the first data line and the second data line while being insulated from the first data line and the second data line; a first switching device connected to the first data line and the gate line; a second switching device connected to the second data line and the gate line; a first pixel electrode connected to the first switching device; a second pixel electrode connected to the second switching device; a first coupling capacitor connected to the first switching device in parallel with the first pixel electrode; a second coupling capacitor connected to the second switching device in parallel with the second pixel electrode; a third pixel electrode connected to the first pixel electrode in parallel through the first coupling capacitor; and a fourth pixel electrode connected to the second pixel electrode in parallel through the second coupling capacitor.

An exemplary embodiment of the present invention further discloses a display is panel that comprises a first substrate comprising a plurality of pixels, each of the pixels comprising at least one gray scale expression unit to express at least two gray scales; a second substrate facing the first substrate; and a liquid crystal layer interposed between the first substrate and the second substrate and subject to a phase transition depending on a voltage generated in relation to the gray scale expression unit. The gray scale expression unit comprises a data line; a gate line crossing the data line and insulated from the data line; a switching device connected to the data line and the gate line; and a pixel electrode connected to the switching device. The pixel electrode is divided into a first portion to a $j^{th}$ portion, j being a natural number not less than 2, and a first thickness of the liquid crystal layer, which is a thickness of the liquid crystal layer interposed between the first portion and the second substrate, is different from a $j^{th}$ thickness of the liquid crystal layer, which is a thickness of the liquid crystal layer interposed between the $j^{th}$ portion and the second substrate It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE ILLUSTRATED EMBODIMENTS

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

Hereinafter, exemplary embodiments of the present invention will be described with reference to the accompanying drawings.

Figure 1:
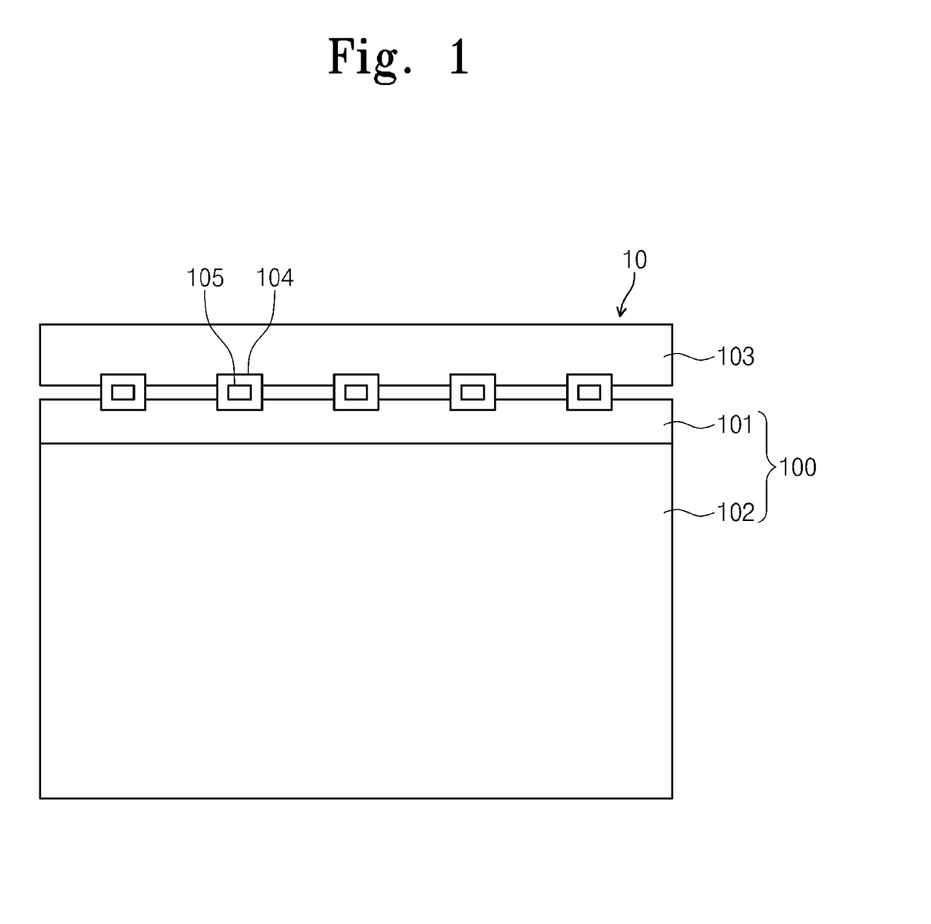
FIG. 1 is a plan view showing a display unit according to an exemplary embodiment of the present invention.

FIG. 1 is a plan view showing a display unit 10 according to an exemplary embodiment of the present invention.

The display unit 10 includes a display panel 100 to display an image and a printed circuit board (PCB) 103 provided at one side of the display panel 100 to output a driving signal.

The display panel 100 includes a first substrate 101, a second substrate 102 facing the first substrate 101, and a liquid crystal layer (not shown) interposed between the first and second substrates 101 and 102.

The PCB 103 is connected to the display panel 100 through a plurality of tape carrier packages (TCP) 104, and a plurality of driving chips 105 are mounted on the tape carrier packages 104.

Each driving chip 105 may include a data driver (not shown) to output a data signal to the display panel 100. A gate driver that outputs a gate signal to the display panel 100 may be directly formed on the display panel 100, for example, through a thin film process. In addition, the driving chips 105 may be mounted on the display panel 100 through a chip on glass (COG) scheme. In this case, the driving chips 105 may be integrated in a single chip.

Figure 2:
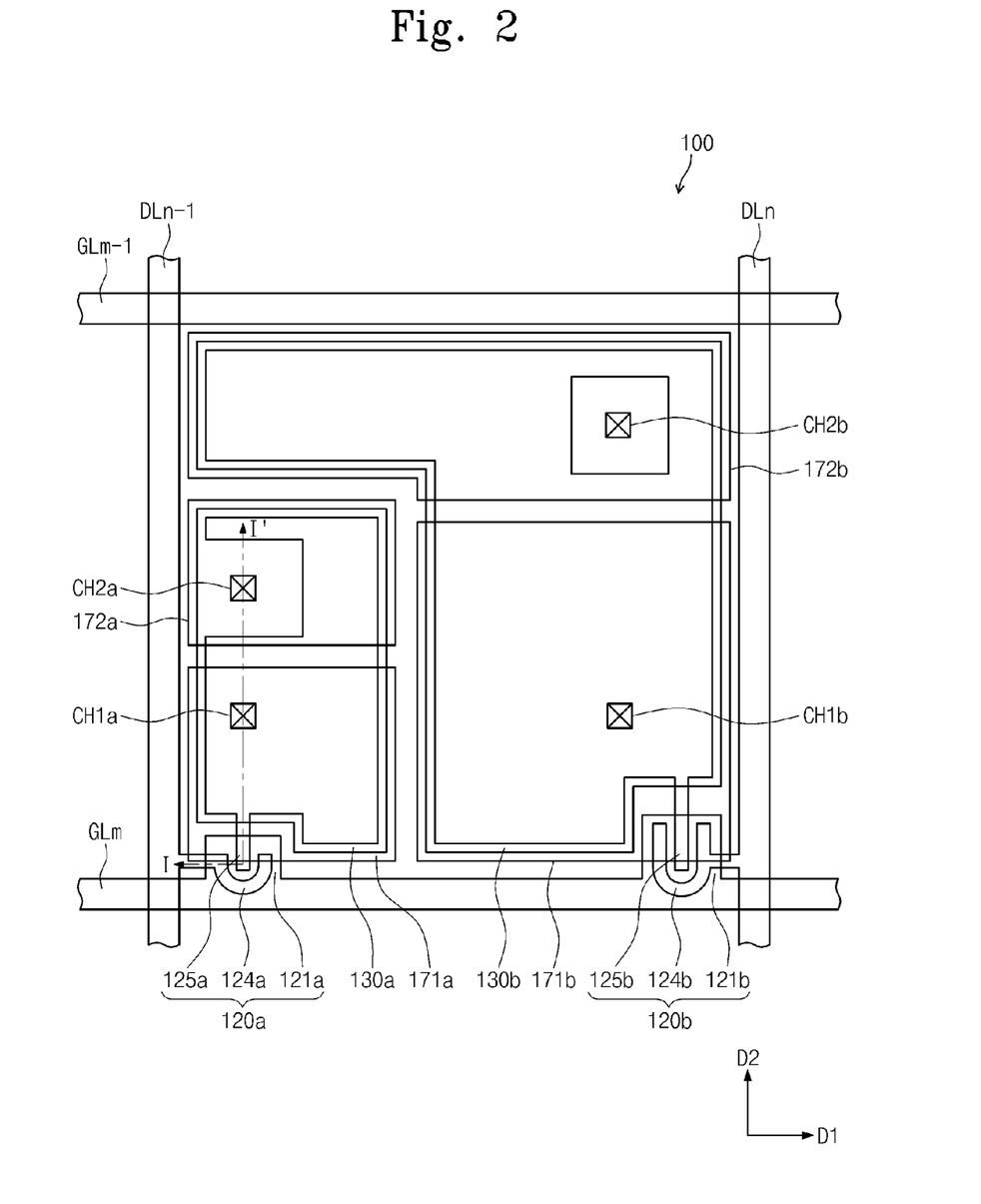
FIG. 2 is a plan view showing a pixel area of the display panel of FIG. 1 according to an exemplary embodiment of the present invention.
Figure 3:
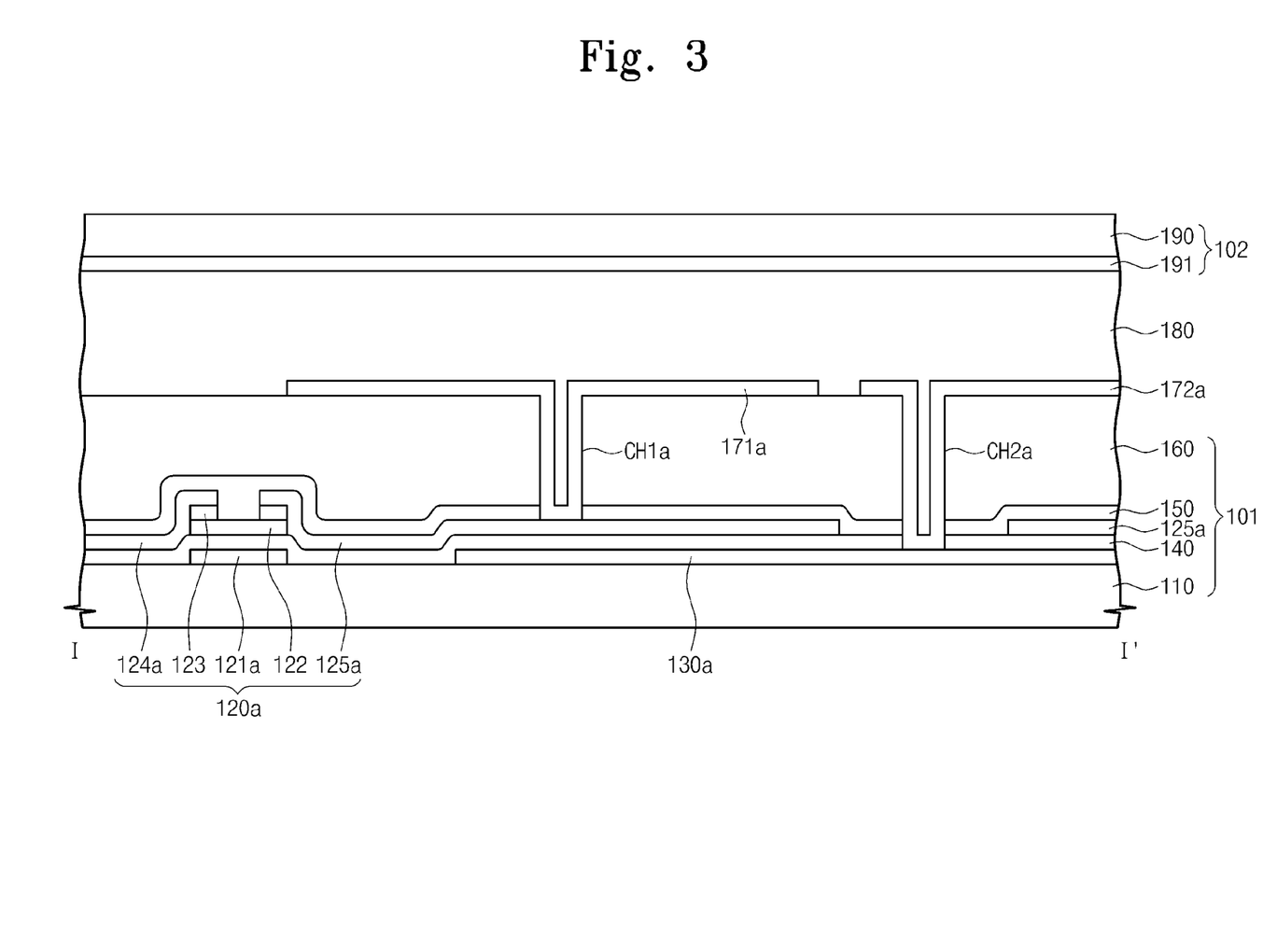
FIG. 3 is a cross-sectional view taken along line I-I' of FIG. 2.

FIG. 2 is a plan view showing a pixel area of the display panel of FIG. 1 according to an exemplary embodiment of the present invention. FIG. 3 is a cross-sectional view taken along line I-I' of FIG. 2, and FIG. 4 is an equivalent circuit diagram of pixel area shown in FIG. 2.

Figure 4:
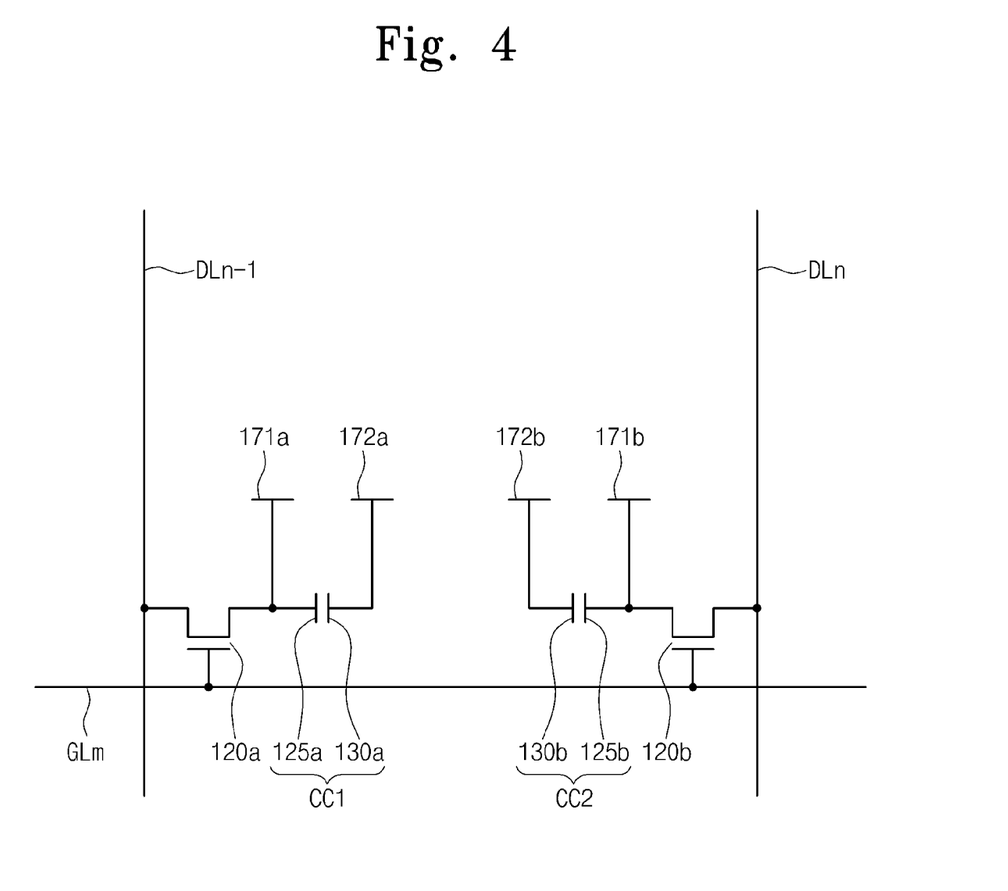
FIG. 4 is an equivalent circuit diagram of the display panel shown in FIG. 2.

Referring to FIG. 2, FIG. 3, and FIG. 4, the display panel 100 includes the first and second substrates 101 and 102. The first substrate 101 includes a first base substrate 110 on which a plurality of pixels are disposed.

The pixels have the same structures and functions so only one pixel area is shown in FIG. 2 for convenience. In addition, a gate line and a data line adjacent to the pixel area are also shown in FIG. 2.

Each pixel includes a first thin film transistor 120a, a second thin film transistor 120b, first and third pixel electrodes 171a and 172a electrically connected to the first thin film transistor 120a, and second and fourth pixel electrodes 171b and 172b electrically connected to the second thin film transistor 120b.

First and second gate lines GLm-1 and GLm cross and are insulated from first and second data lines DLn-1 and DLn. The first and second gate lines GLm-1 and GLm and the first and second data lines DLn-1 and DLn are provided on the first base substrate 110 of the first substrate 101. The first and second gate lines GLm-1 and GLm extend in a first direction D1, and the first and second data lines DLn-1 and DLn extend in a second direction D2, which is perpendicular to the first direction D1. An insulating layer 140 is interposed between the first and second gate lines GLm-1 and GLm and the first and second data lines DLn-1 and DLn.

The first thin film transistor 120a includes a first gate electrode 121a, a first source electrode 124a, and a first drain electrode 125a and is electrically connected to the second is gate line GLm and the first data line DLn-1. In more detail, the first gate electrode 121a of the first thin film transistor 120a branches from the second gate line GLm, and the first source electrode 124a of the first thin film transistor 120a branches from the first data line DLn-1. In addition, the first drain electrode 125a of the first thin film transistor 120a is spaced apart from the first source electrode 124a by a distance and connected to the first pixel electrode 171a through a first contact hole CH1a.

The first substrate 101 further includes a first coupling electrode 130a in which a portion of the first coupling electrode 130a faces the first drain electrode 125a. The first coupling electrode 130a is electrically insulated from the first drain electrode 125a and faces the first drain electrode 125a to form an electric field when voltages are applied thereto.

The third pixel electrode 172a is spaced apart from the first pixel electrode 171a by a distance and connected to the first coupling electrode 130a through a third contact hole CH2a. The first drain electrode 125a may not extend to a region where the third contact hole CH2a is formed so that the third pixel electrode 172a may be connected to the first coupling electrode 130a through the third contact hole CH2a.

The second thin film transistor 120b includes a second gate electrode 121b, a second source electrode 124b, and a second drain electrode 125b and is electrically connected to the second gate line GLm and the second data line DLn. In more detail, the second gate electrode 121b of the second thin film transistor 120b branches from the second gate line GLm, and the second source electrode 124b of the second thin film transistor 120b branches from the second data line DLn. In addition, the second drain electrode 125b of the second thin film transistor 120b is spaced apart from the second source electrode 124b by a distance and connected to the second pixel electrode 171b through a second contact hole CH1b.

The first substrate 101 further includes a second coupling electrode 130b in which a portion of the second coupling electrode 130b faces the second drain electrode 125b. The second coupling electrode 130b is electrically insulated from the second drain electrode 125b and faces the second drain electrode 125b to form an electric field when voltages are applied thereto.

The fourth pixel electrode 172b is spaced apart from the second pixel electrode 171b by a distance and connected to the second coupling electrode 130b through a fourth contact hole CH2b. The second drain electrode 125b may not extend to a region where the fourth contact hole CH2b is formed so that the fourth pixel electrode 172b may be connected to the second coupling electrode 130b through the fourth contact hole CH2b.

Referring to FIG. 3, the display panel 100 includes the first substrate 101, the second substrate 102 facing the first substrate 101, and a liquid crystal layer 180 interposed between the first and second substrates 101 and 102.

The first gate electrode 121a and the first coupling electrode 130a are provided on the first base substrate 110 of the first substrate 101. The first gate electrode 121a and the first coupling electrode 130a are covered with the insulating layer 140. An active layer 122 and an ohmic contact layer 123 are provided on the insulating layer 140 corresponding to the region where the first gate electrode 121a is formed. Thus, the first source electrode 124a and the first drain electrode 125a face the first gate electrode 121a while the insulating layer 140, the active layer 122, and the ohmic contact layer 123 interpose therebetween.

The first thin film transistor 120a is covered with a protective layer 150. An organic insulating layer 160 is formed on the protective layer 150.

The first contact hole CH1a is formed through the protective layer 150 and the is organic insulating layer 160 so that the first drain electrode 125a of the first thin film transistor 120a is exposed through the first contact hole CH1a. The first pixel electrode 171a is formed on the organic insulating layer 160 and electrically connected to the first drain electrode 125a through the first contact hole CH1a.

The third contact hole CH2a is formed through the protective layer 150 and the organic insulating layer 160 so that the first coupling electrode 130a is exposed through the third contact hole CH2a. The third pixel electrode 172a is formed on the organic insulating layer 160 and electrically connected to the first coupling electrode 130a through the third contact hole CH2a.

The second substrate 102 includes a second base substrate 190 and a common electrode 191. The second base substrate 190 may include flexible material. For instance, the second base substrate 190 may include polyethylene terephthalate (PET), one or more fiber reinforced plastics, or polyethylene naphthalate (PEN).

The common electrode 191 is disposed between the second base substrate 190 and the liquid crystal layer 180 to receive a common voltage. The common electrode 191 includes transparent material such that light incident into the second base substrate 190 can be supplied to the liquid crystal layer 180 or light incident into the liquid crystal layer 180 can be supplied to the second base substrate 190.

The liquid crystal layer 180 may include a cholesteric liquid crystal or a bistable liquid crystal.

The state of the cholesteric liquid crystal may be changed according to the electric field applied thereto. The cholesteric liquid crystal may have a homeotropic state that is formed under relatively high voltage to absorb the incident light, a planar state that may be formed under is relatively low voltage to reflect light having a specific wavelength from the incident light, and a focal conic state that may be formed when the high voltage is smoothly lowered, i.e., in a continuous, non-abrupt fashion, to the low voltage to allow the incident light to pass through the liquid crystal. A reflective display panel may be employed whereby the reflective display panel may express a gray scale by using the homeotropic state and the planar state of the cholesteric liquid crystal.

When the planar state of the cholesteric liquid crystal is used, the wavelength of the light reflected from the cholesteric liquid crystal may be changed by adjusting the amount of chiral dopant added to the cholesteric liquid crystal. In more detail, the wavelength of the light reflected from the cholesteric liquid crystal may be adjusted to shorter wavelengths as the amount of chiral dopant added to the cholesteric liquid crystal is increased. Thus, the color may be adjusted so that a desired color may be realized without using a color filter by adjusting the amount of chiral dopant added to the cholesteric liquid crystal used in each pixel.

The bistable liquid crystal has two states depending on an electric field applied to it and includes a nemoptic liquid crystal, a bistable twisted nematic liquid crystal, a three-terminal bistable twisted nematic liquid crystal, a bistable chiral splay nematic liquid crystal, and a bistable bend splay liquid crystal. Among these bistable forms, when a liquid crystal unable to express color by itself is used, a color filter may be provided on the first substrate 101 or the second substrate 102.

When the cholesteric liquid crystal is used in the liquid crystal layer 180, the phase transition may occur between the homeotropic state and the planar state on the basis of a threshold voltage between the pixel electrode and the common electrode.

Referring to FIG. 2, FIG. 3, and FIG. 4, the display panel 100 includes a first is coupling capacitor CC1 and a second coupling capacitor CC2. The first coupling capacitor CC1 includes the first drain electrode 125a and the first coupling electrode 130a, and the second coupling capacitor CC2 includes the second drain electrode 125b and the second coupling electrode 130b.

A voltage identical to the voltage from the first data line DLn-1 is applied to the first pixel electrode 171a. However, due to the first coupling capacitor CC1, the voltage applied to the third pixel electrode 172a may be lower than the voltage input from the first data line DLn-1. Therefore, under a certain voltage conditions, a liquid crystal layer subject to an electric field generated by the first pixel electrode 171a may have a planar state to express a specific color, but a liquid crystal layer subject to the electric field generated by the third pixel electrode 172a may express a black gray scale. Thus, one pixel including the first and third pixel electrodes 171a and 172a may express three gray scales.

In addition, the second and fourth pixel electrodes 171b and 172b may operate similarly to the first and third pixel electrodes 171a and 172a. If the area ratio among the first, second, third, and fourth pixel electrodes (171a, 171b, 172a, and 172b) shown in FIG. 2 is set to approximately 1:3:1:3, one pixel including the first, second, third, and fourth pixel electrodes (171a, 171b, 172a, and 172b) can express nine gray scales according to the voltage input from the data lines DLn-1 and DLn.

Although FIG. 2, FIG. 3, and FIG. 4 show a pixel including two transistors connected to two data lines, respectively, and two pixel electrodes connected to the two transistors, respectively, the number of transistors and pixel electrodes or the number of data lines and gate lines connected to the transistors may vary depending on the number of gray scales required for the display apparatus.

Figure 5:
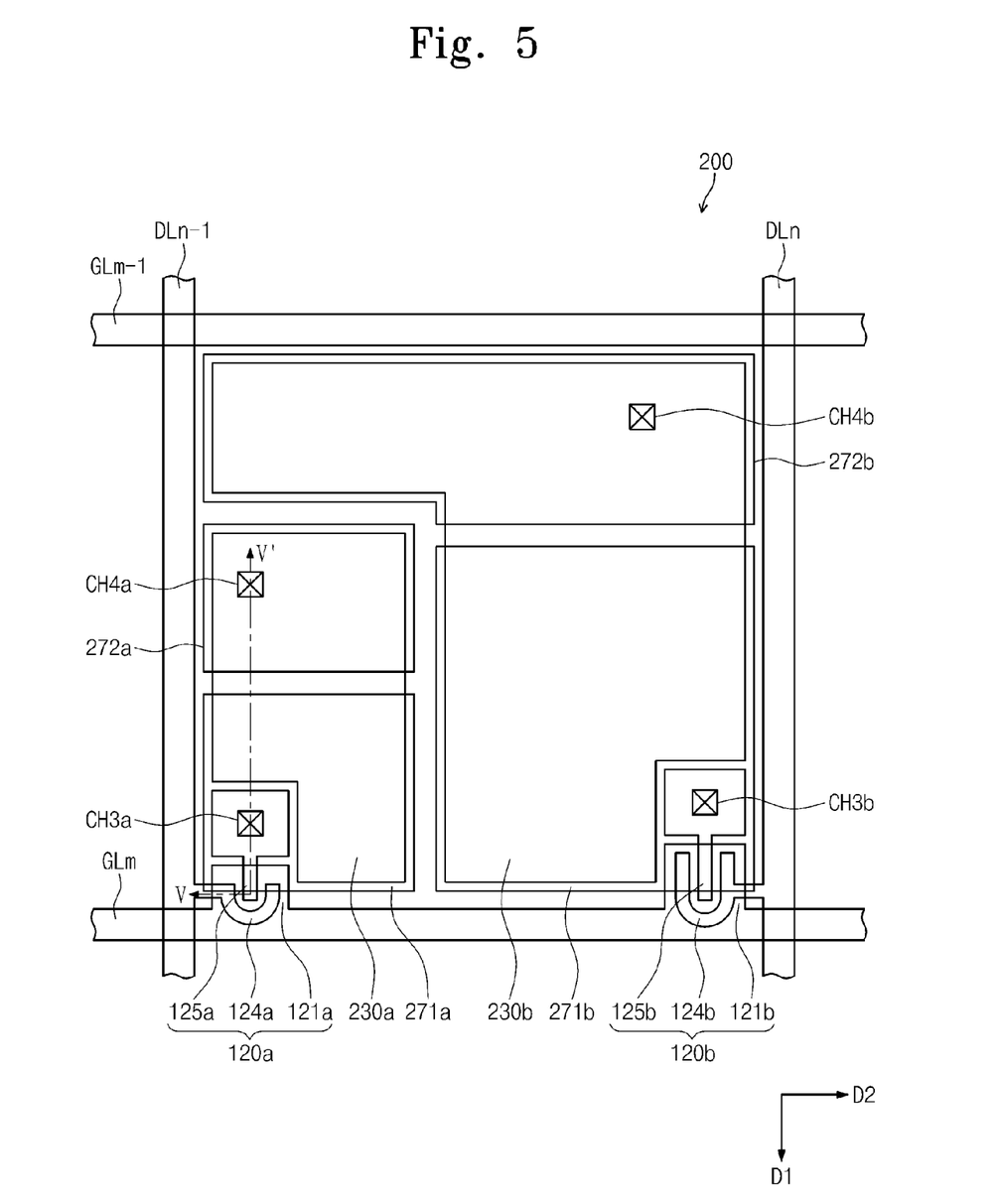
FIG. 5 is a plan view showing a pixel area of a display panel according to another exemplary embodiment of the present invention.
Figure 6:
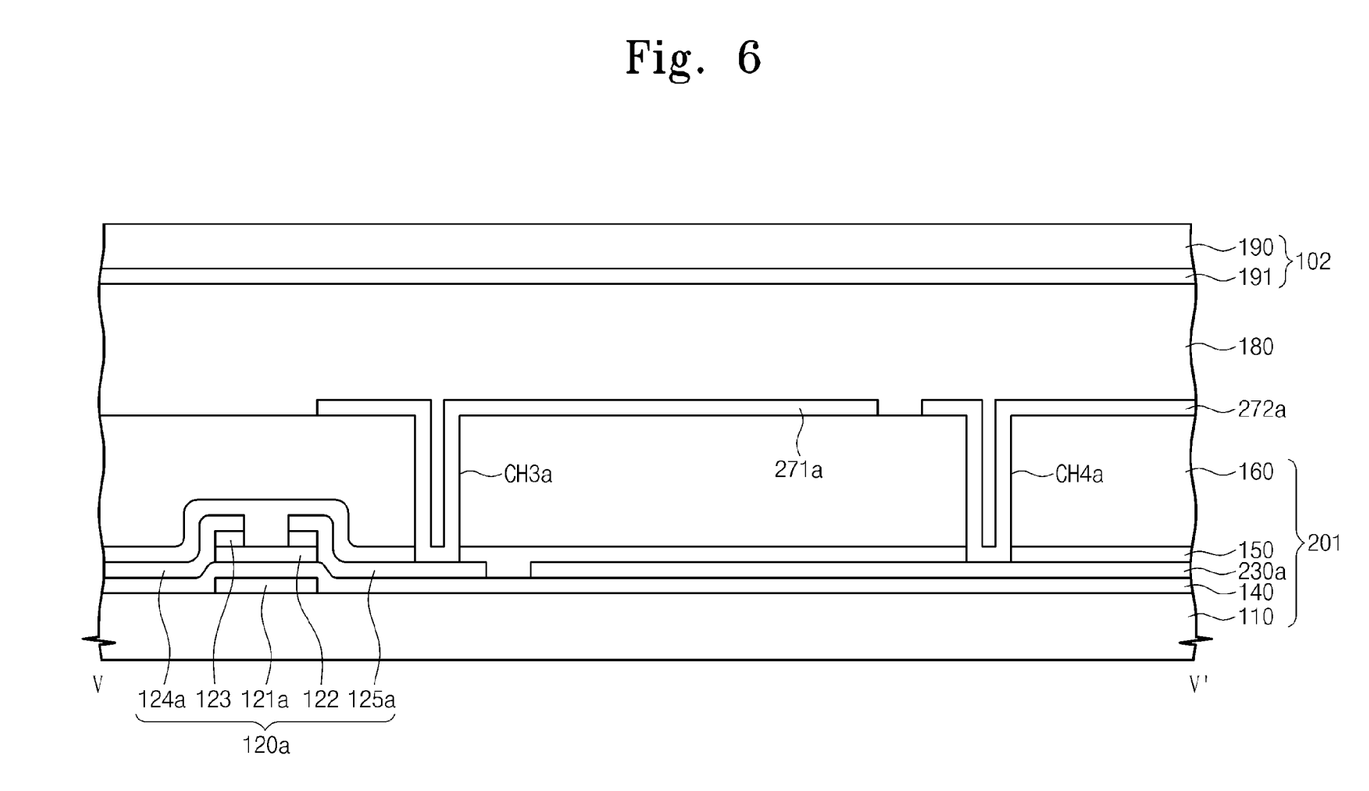
FIG. 6 is a cross-sectional view taken along line V-V' of FIG. 5.

FIG. 5 is a plan view showing a pixel area of a display panel 200 according to another exemplary embodiment of the present invention, and FIG. 6 is a cross-sectional view taken along line V-V' of FIG. 5.

In the following description of the display panel of FIG. 5 and FIG. 6, the same reference numerals are assigned to the same elements as in the above-described exemplary embodiments, and detailed descriptions thereof are omitted to avoid redundancy.

Referring to FIG. 5 and FIG. 6, the display panel 200 includes a first substrate 201 and the second substrate 102. The first substrate 201 includes the first base substrate 110 on which a plurality of pixels are disposed.

The pixels have the same structures and functions so only one pixel area is shown in FIG. 5 for convenience. In addition, gate lines GLm-1 and GLm and data lines DLn-1 and DLn adjacent to the pixel area are shown in FIG. 5.

Each pixel includes the first thin film transistor 120a, the second thin film transistor 120b, first and third pixel electrodes 271a and 272a electrically connected to the first thin film transistor 120a, and second and fourth pixel electrodes 271b and 272b electrically connected to the second thin film transistor 120b.

The first gate electrode 121a of the first thin film transistor 120a branches from the second gate line GLm, and the first source electrode 124a of the first thin film transistor 120a branches from the first data line DLn-1. In addition, the first drain electrode 125a of the first thin film transistor 120a is spaced apart from the first source electrode 124a by a distance and connected to the first pixel electrode 271a through a first contact hole CH3a.

The first substrate 201 further includes a first coupling electrode 230a in which a portion of the first coupling electrode 230a faces the first pixel electrode 271a. The first is coupling electrode 230a is spaced apart from the first drain electrode 125a by a distance while facing the first pixel electrode 271a to form an electric field when voltages are applied thereto.

The third pixel electrode 272a is spaced apart from the first pixel electrode 271a by a distance and connected to the first coupling electrode 230a through a third contact hole CH4a.

Referring to FIG. 6, the display panel 200 includes the first substrate 201, the second substrate 102 facing the first substrate 201, and the liquid crystal layer 180 interposed between the first and second substrates 201 and 102.

The first gate electrode 121a is disposed on the first base substrate 110 of the first substrate 201. The first gate electrode 121a is covered with the insulating layer 140. The first source electrode 124a and the first drain electrode 125a face the first gate electrode 121a while the insulating layer 140, the active layer 122, and the ohmic contact layer 123 are disposed therebetween.

The first coupling electrode 230a is formed on the insulating layer 140 while being spaced apart from the first source electrode 124a and the first drain electrode 125a by a distance. A portion of the first coupling electrode 230a faces the first pixel electrode 271a to form the electric field when voltages are applied thereto.

The first thin film transistor 120a is covered with the protective layer 150. The organic insulating layer 160 is formed on the protective layer 150.

The first contact hole CH3a is formed through the protective layer 150 and the organic insulating layer 160 so that the first drain electrode 125a of the first thin film transistor 120a is exposed through the first contact hole CH3a. The first pixel electrode 271a is formed on the organic insulating layer 160 and electrically connected to the first drain electrode 125a is through the first contact hole CH3a.

The third contact hole CH4a is formed through the protective layer 150 and the organic insulating layer 160 so that the first coupling electrode 230a is exposed through the third contact hole CH4a. The third pixel electrode 272a is formed on the organic insulating layer 160 and electrically connected to the first coupling electrode 230a through the third contact hole CH4a.

Similar to FIG. 2, FIG. 3, and FIG. 4, one pixel including the first and third pixel electrodes 271a and 272a may express three gray scales. In addition, if the area ratio among the first, second, third, and fourth pixel electrodes 271a, 271b, 271a, and 272b is set to approximately 1:3:1:3, one pixel including the first, second, third, and fourth pixel electrodes 271a, 271b, 271a, and 272b may express nine gray scales according to the voltage input from the data lines DLn-1 and DLn.

Figure 7:
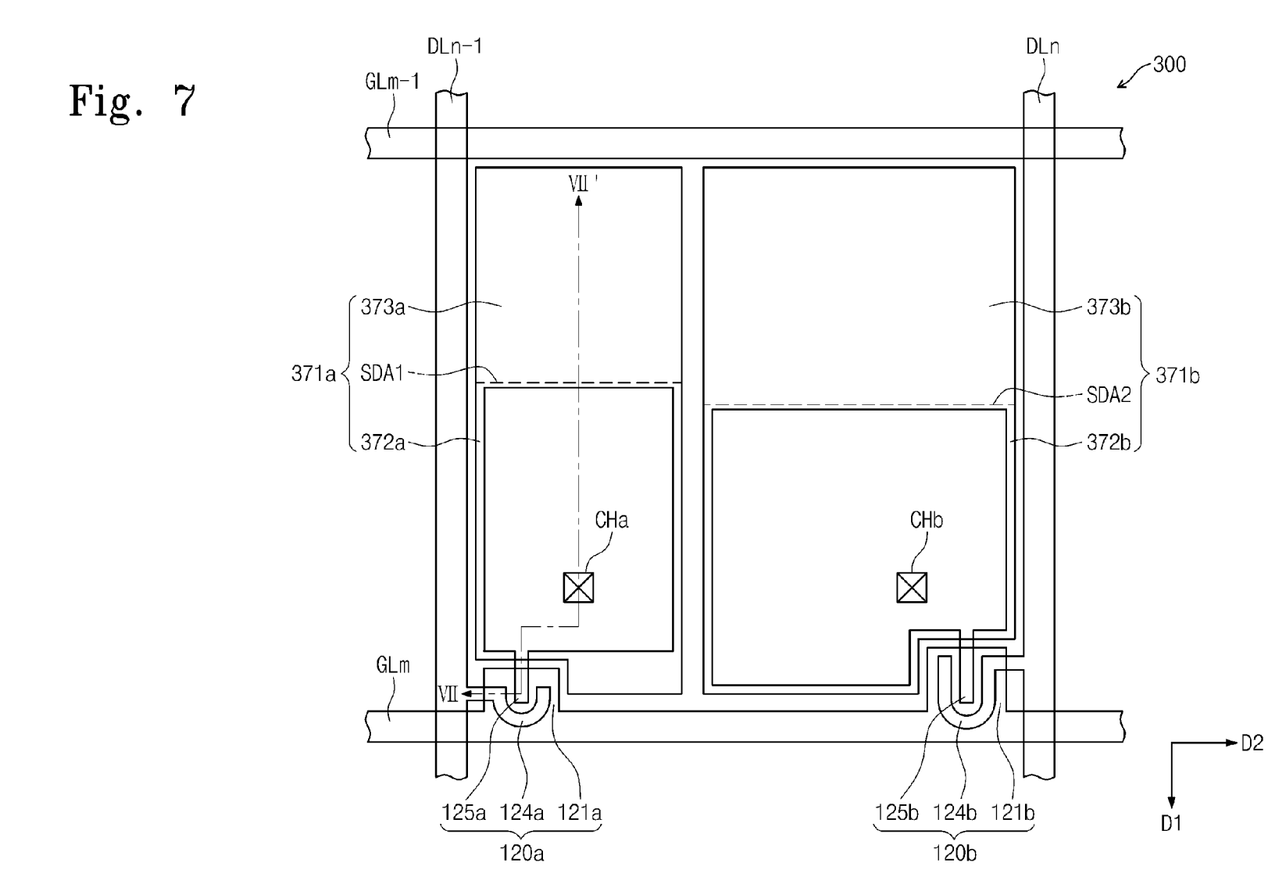
FIG. 7 is a plan view showing a pixel area of a display panel according to still another exemplary embodiment of the present invention.
Figure 8:
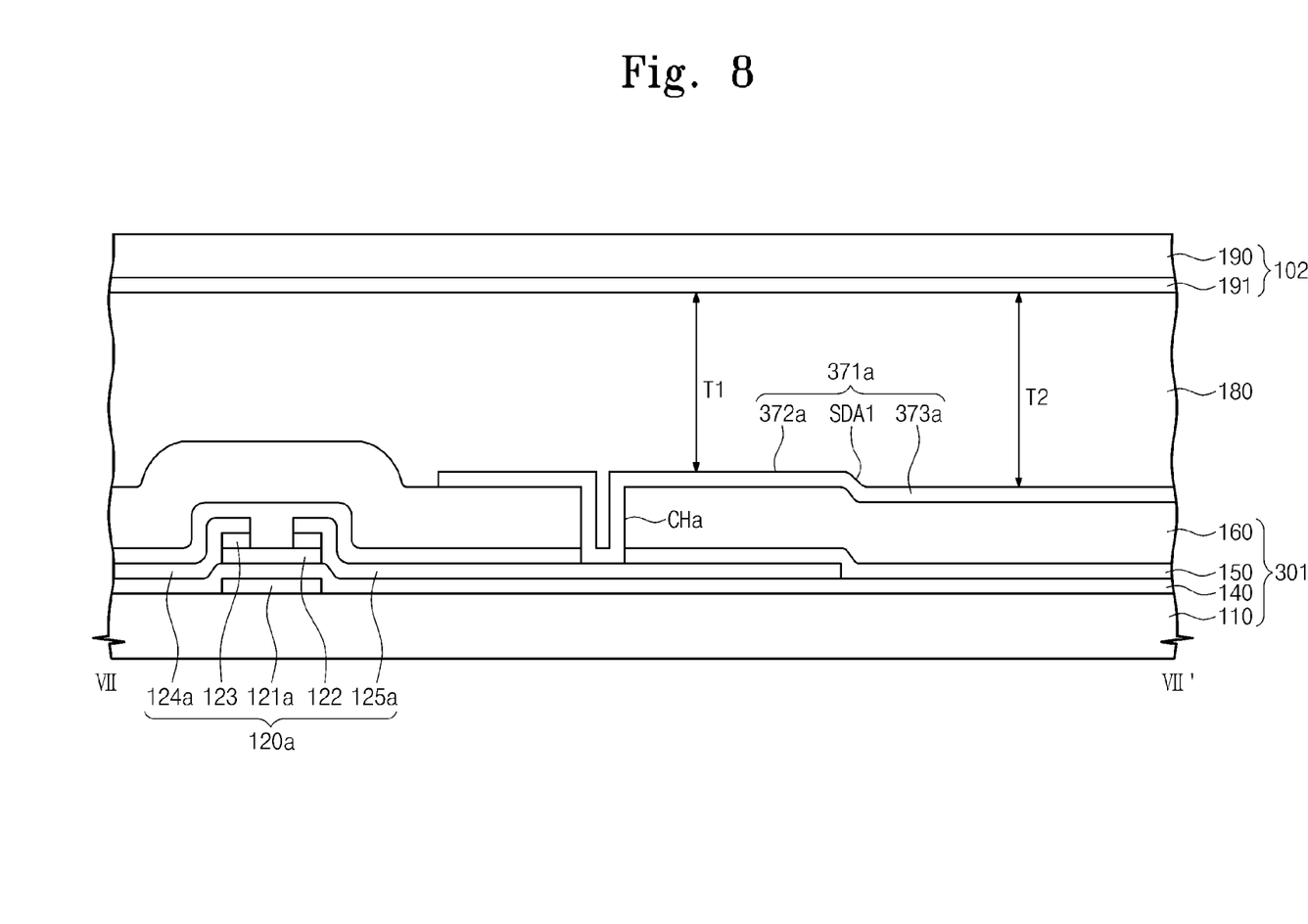
FIG. 8 is a cross-sectional view taken along line VII-VII' of FIG. 7.

FIG. 7 is a plan view showing a pixel area of a display panel according to still another exemplary embodiment of the present invention, and FIG. 8 is a cross-sectional view taken along line VII-VII' of FIG. 7.

Referring to FIG. 7 and FIG. 8, the display panel 300 includes a first substrate 301 and the second substrate 102. The first substrate 301 includes the first base substrate 110 on which a plurality of pixels are disposed.

The pixels have the same structures and functions so only one pixel area is shown in FIG. 7 for convenience. In addition, gate lines and data lines adjacent to the pixel area are shown in FIG. 7.

Each pixel includes the first thin film transistor 120a, the second thin film transistor 120b, a first pixel electrode 371a electrically connected to the first thin film transistor 120a, and a second pixel electrode 371b electrically connected to the second thin film transistor 120b.

The first drain electrode 125a is spaced apart from the first source electrode 124a by a distance and connected to the first pixel electrode 371a through a first contact hole CHa. In addition, the second drain electrode 125b is spaced apart from the second source electrode 124b by a distance and connected to the second pixel electrode 371b through a second contact hole CHb.

The first pixel electrode 371a is divided into a first portion 372a and a second portion 373a on the basis of a first step difference area SDA1. In addition, the second pixel electrode 371b is divided into a third portion 372b and a fourth portion 373b on the basis of a second step difference area SDA2.

Referring to FIG. 8, the display panel 300 includes the first substrate 301, the second substrate 102 facing the first substrate 301, and the liquid crystal layer 180 interposed between the first and second substrates 301 and 102.

The first thin film transistor 120a is covered with the protective layer 150. The organic insulating layer 160 is disposed on the protective layer 150.

The first contact hole CHa is formed through the protective layer 150 and the organic insulating layer 160 so that the first drain electrode 125a of the first thin film transistor 120a is exposed through the first contact hole CHa. The first pixel electrode 371a is disposed on the organic insulating layer 160 and electrically connected to the first drain electrode 125a through the first contact hole CHa.

In general, the thickness of the organic insulating layer 160 may compensate for a step difference among layers positioned under the organic insulating layer 160. However, referring to FIG. 8, the organic insulating layer 160 may have a variable thickness so that a step difference among layers positioned under the organic insulating layer 160 may also occur at the first pixel electrode 371a.

Thus, the first pixel electrode 371a may have the first step difference area SDA1 caused by the first drain electrode 125a located below the first pixel electrode 371a. The first pixel electrode 371a is divided into the first portion 372a and the second portion 373a on the basis of the first step difference area SDA1. Therefore, a first thickness T1, which is a thickness of the liquid crystal layer 180 interposed between the first portion 372a and the common electrode 191, is different from a second thickness T2, which is a thickness of the liquid crystal layer 180 interposed between the second portion 373a and the common electrode 191.

If the cholesteric liquid crystal is used in the liquid crystal layer 180, the phase transition may occur between the homeotropic state and the planar state on the basis of a threshold voltage Vth between the pixel electrode and the common electrode. The threshold voltage Vth satisfies the following equation:

$$V_{th} = \frac{\pi^2 d}{p} \sqrt{\frac{K_{22}}{\Delta \varepsilon}}$$ [Equation]

In the above equation, d is a cell gap; $K_{22}$ is a twist elastic constant; p is a pitch size; and $\Delta \varepsilon$ is a dielectric anisotropy.

From the above equation, the threshold voltage Vth of the cholesteric liquid crystal is proportional to the cell gap d of the liquid crystal layer. Therefore, one pixel electrode of the present exemplary embodiment may express three gray scales or more by adjusting the cell gap of the cholesteric liquid crystal formed on the pixel electrode.

As an example, the threshold voltage of the liquid crystal layer on the first portion 372a is defined as a first threshold voltage Vth1a, and the threshold voltage of the liquid crystal layer on the second portion 373a is defined as a second threshold voltage Vth2a. The first thickness T1 is smaller than the second thickness T2.

If a voltage difference V between a common voltage applied to the common electrode 191 and a data voltage applied to the first drain electrode 125a input from the first data line DLn-1 is lower than the first and second threshold voltages Vth1a and Vth2a, the cholesteric liquid crystal on the first and second portions 372a and 373a has the planar state so that the cholesteric liquid crystal reflects a specific color. If the voltage difference V is higher than the first threshold voltage Vth1a and lower than the second threshold voltage Vth2a, the cholesteric liquid crystal on the first portions 372a has the homeotropic state so that the cholesteric liquid crystal expresses the black gray scale and the cholesteric liquid crystal on the second portion 373a has the planar state so that the cholesteric liquid crystal reflects a specific color. In addition, if the voltage difference V is higher than the first and second threshold voltages Vth1a and Vth2a, the cholesteric liquid crystal on the first and second portions 372a and 373a has the homeotropic state so that the cholesteric liquid crystal expresses the black gray scale.

The third and fourth portions 372b and 373b may function similarly to the first and second portions 372a and 373a. If the area ratio among the first, second, third, and fourth portions 372a, 372b, 373a, and 373b is set to approximately 1:1:3:3, the pixel shown in FIG. 7 may express nine gray scales.

Referring to FIG. 7 and FIG. 8, the thickness of the liquid crystal layer 180 interposed between the first and second substrates 301 and 102 is adjusted by the thicknesses of the first and second drain electrodes 125a and 125b. Alternatively or in combination with the first and second drain electrodes 125a and 125, the thickness of the liquid crystal layer 180 can be adjusted by adjusting the thickness of the organic insulating layer 160, the protective layer 150, or the common electrode 191.

Figure 9:
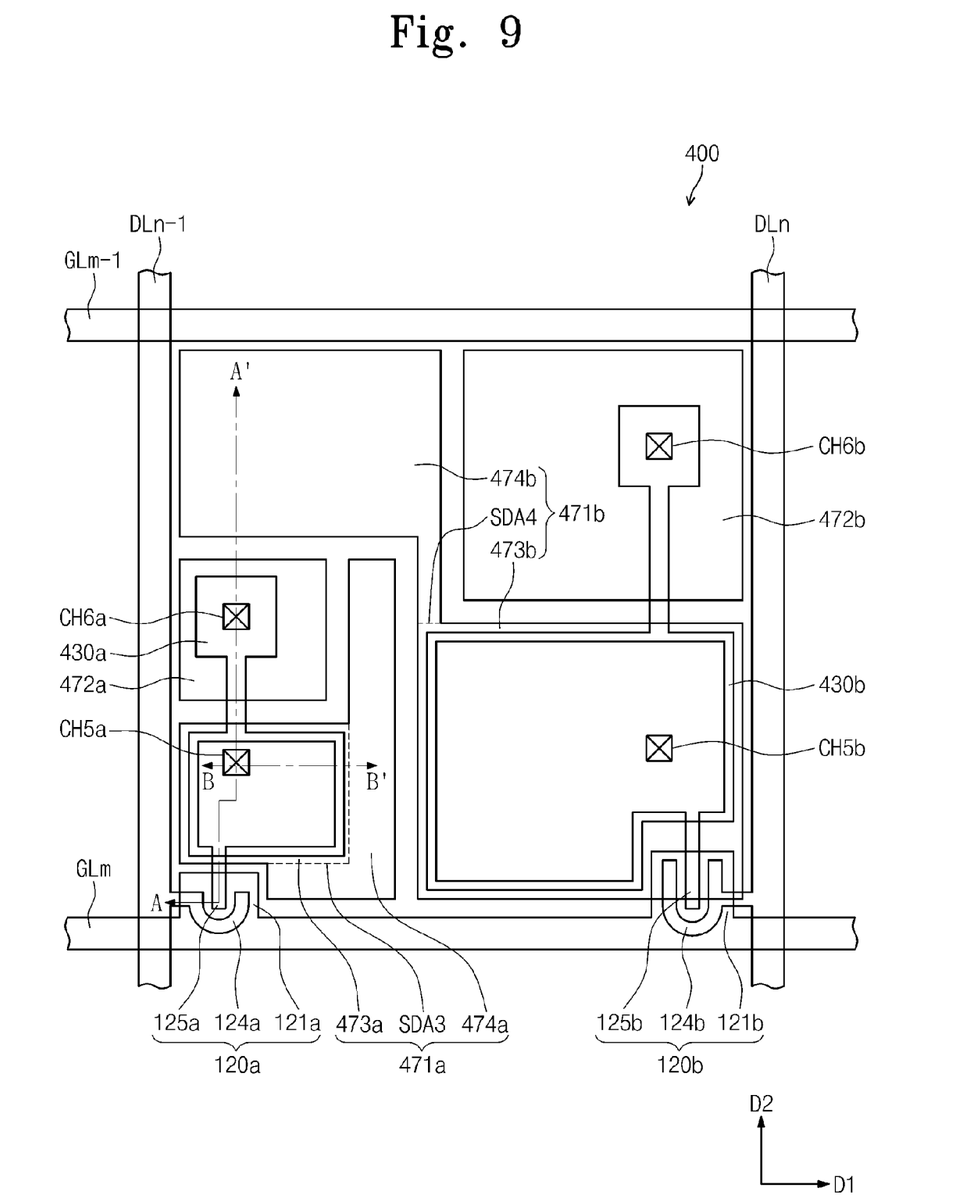
FIG. 9 is a plan view showing a pixel area of a display panel according to yet another exemplary embodiment of the present invention.
Figure 10:
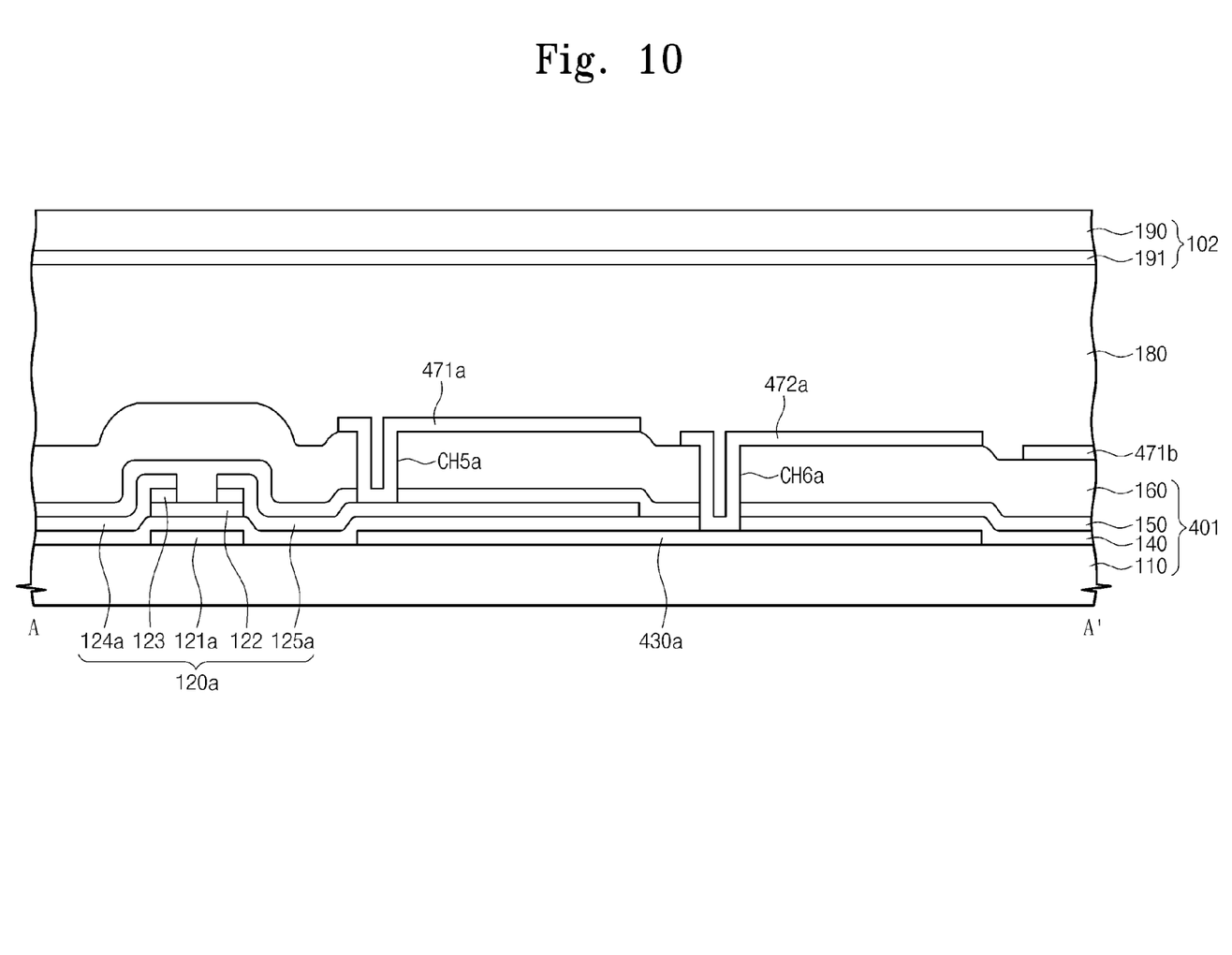
FIG. 10 is a cross-sectional view taken along line A-A' of FIG. 9.

FIG. 9 is a plan view showing a pixel area of a display panel according to yet another exemplary embodiment of the present invention. FIG. 10 is a cross-sectional view taken along line A-A' of FIG. 9, and FIG. 11 is a cross-sectional view taken along line B-B' of FIG. 9.

Figure 11:
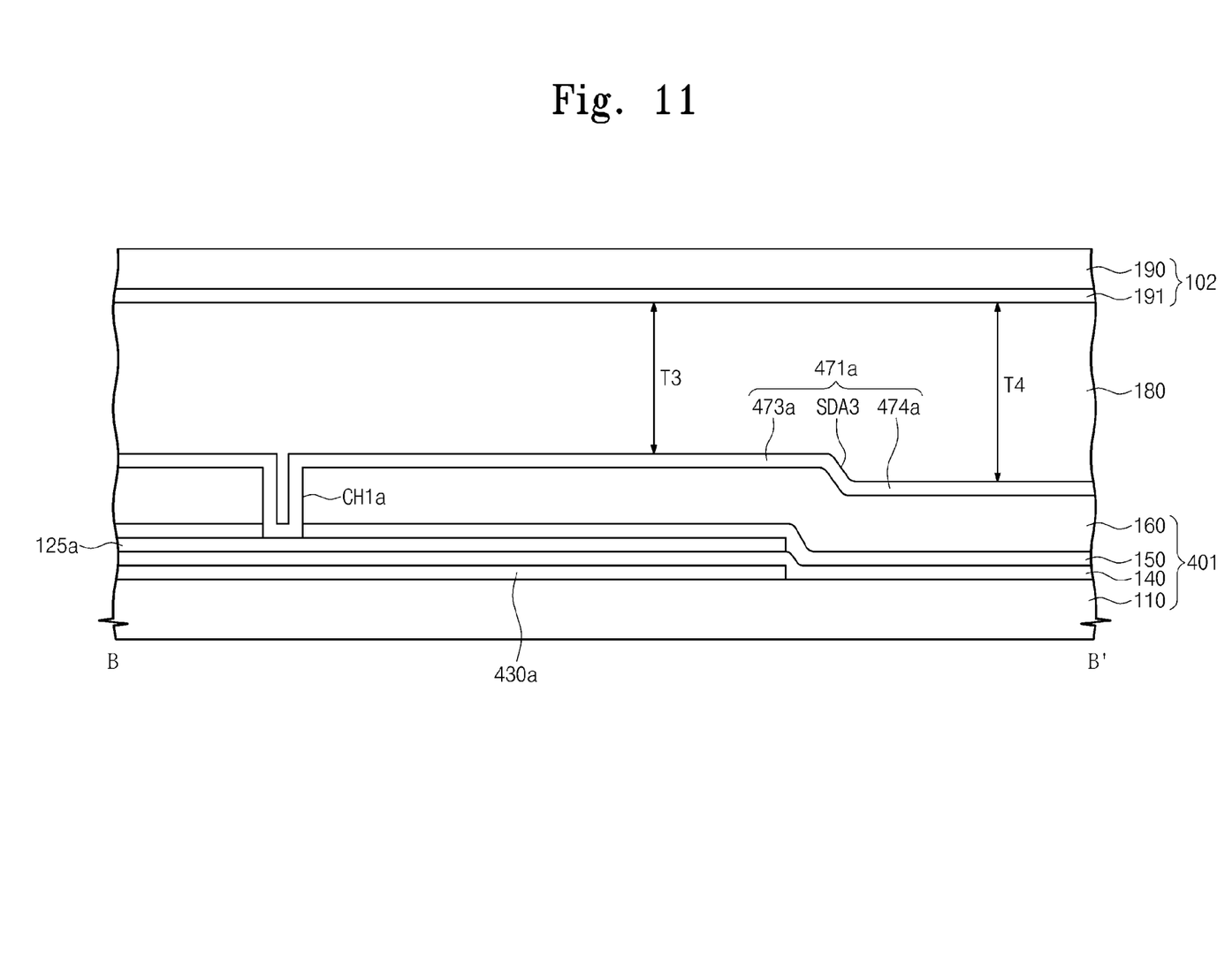
FIG. 11 is a cross-sectional view taken along line B-B' of FIG. 9.

Referring to FIG. 9, FIG. 10, and FIG. 11, the display panel 400 includes a first substrate 401 and the second substrate 102. The first substrate 401 includes the first base substrate 110 on which a plurality of pixels are disposed.

The pixels have the same structures and functions so only one pixel area is shown in FIG. 9 for convenience. In addition, gate lines and data lines adjacent to the pixel area are shown in FIG. 9.

Each pixel includes the first thin film transistor 120a, the second thin film transistor 120b, first and third pixel electrodes 471a and 472a electrically connected to the first thin film transistor 120a, and second and fourth pixel electrodes 471b and 472b electrically connected to the second thin film transistor 120b.

The first drain electrode 125a is spaced apart from the first source electrode 124a by a distance and connected to the first pixel electrode 471a through a first contact hole CH5a. In addition, the second drain electrode 125b is spaced apart from the second source electrode 124b by a distance and connected to the second pixel electrode 471b through a second contact hole CH5b.

The first pixel electrode 471a is divided into a first portion 473a and a second portion 474a by a first step difference area SDA3. In addition, the second pixel electrode 471b is divided into a third portion 473b and a fourth portion 474b by a second step difference area SDA4.

The first substrate 401 further includes a first coupling electrode 430a in which a portion of the first coupling electrode 430a faces the first drain electrode 125a and a second coupling electrode 430b in which a portion of the second coupling electrode 430b faces the second drain electrode 125b. The first coupling electrode 430a is electrically insulated from the first drain electrode 125a while facing the first drain electrode 125a to form an electric field. The second coupling electrode 430b is electrically insulated from the second drain electrode 125b while facing the second drain electrode 125b to form an electric field.

The third pixel electrode 472a is spaced apart from the first pixel electrode 471a by a distance and connected to the first coupling electrode 430a through a third contact hole CH6a. The first drain electrode 125a may not extend to a region where the third contact hole CH6a is formed so that the third pixel electrode 472a can be connected to the first coupling electrode 430a through the third contact hole CH6a.

In addition, the fourth pixel electrode 472b is spaced apart from the second pixel electrode 471b by a distance and connected to the second coupling electrode 430b through a fourth contact hole CH6b. The second drain electrode 125b may not extend to a region where the fourth contact hole CH6b is formed so that the fourth pixel electrode 472b may be connected to the second coupling electrode 430b through the fourth contact hole CH6b.

Referring to FIG. 10 and FIG. 11, the display panel 400 includes the first substrate 401, the second substrate 102 facing the first substrate 401, and the liquid crystal layer 180 interposed between the first and second substrates 401 and 102.

The first gate electrode 121a and the first coupling electrode 430a are disposed on the first base substrate 110 of the first substrate 401. The first gate electrode 121a and the first is coupling electrode 430a are covered with the insulating layer 140.

The first thin film transistor 120a is covered with the protective layer 150. The organic insulating layer 160 is formed on the protective layer 150.

The first contact hole CH5a is formed through the protective layer 150 and the organic insulating layer 160 so that the first drain electrode 125a of the first thin film transistor 120a is exposed through the first contact hole CH5a. The first pixel electrode 471a is formed on the organic insulating layer 160 and electrically connected to the first drain electrode 125a through the first contact hole CH5a.

The third contact hole CH6a is formed through the protective layer 150 and the organic insulating layer 160 so that the first coupling electrode 430a is exposed through the third contact hole CH6a. The third pixel electrode 472a is formed on the organic insulating layer 160 and electrically connected to the first coupling electrode 430a through the third contact hole CH6a.

In general, the thickness of the organic insulating layer 160 sufficiently compensates for a step difference among layers positioned under the organic insulating layer 160. However, referring to FIG. 10 and FIG. 11, the thickness of the organic insulating layer 160 may be such that a step difference among layers positioned under the organic insulating layer 160 may appear at the first pixel electrode 471a.

Thus, referring to FIG. 11, the first pixel electrode 471a may have a first step difference area SDA3 caused by the first drain electrode 125a and the first coupling electrode 430a located below the first pixel electrode 471a. The first pixel electrode 471a is divided into the first portion 473a and the second portion 474a based on the first step difference area SDA1. Therefore, a first thickness T3, which is a thickness of a liquid crystal layer 180 interposed is between the first portion 473a and the common electrode 191, is different from a second thickness T4, which is a thickness of a liquid crystal layer 180 interposed between the second portion 474a and the common electrode 191.

A pixel including the first and third pixel electrodes 471a and 472a expresses the gray scales as described below.

First, the threshold voltage of the liquid crystal layer on the first portion 473a of the first pixel electrode 471a is defined as a first threshold voltage Vth1a, and the threshold voltage of the liquid crystal layer on the second portion 474a of the first pixel electrode 471a is defined as a second threshold voltage Vth2a. In this case, if the first thickness T3 is smaller than the second thickness T4, the first threshold voltage Vth1a is smaller than the second threshold voltage Vth2a.

In addition, a voltage of the liquid crystal layer 180 on the third pixel electrode 472a connected to the first coupling electrode 430a through the third contact hole CH6a is defined as a third threshold voltage Vth3a. Also, the third threshold voltage Vth3a is assumed to be larger than the second threshold voltage Vth2a.

Under the above circumstance, if the voltage difference V between a common voltage applied to the common electrode 191 and a data voltage applied to the first drain electrode 125a is lower than the first, second, and third threshold voltages Vth1a, Vth2a, and Vth3a, the cholesteric liquid crystal on the first and second portions 473a and 474a and the third pixel electrode 472a has the planar state so that the cholesteric liquid crystal reflects a specific color. If the voltage difference V is higher than the first threshold voltage Vth1a and lower than the second and third threshold voltage Vth2a and Vth3a, the cholesteric liquid crystal on the first portion 473a has the homeotropic state so that the cholesteric liquid crystal expresses the black is gray scale, and the cholesteric liquid crystal on the second portion 474a and the third pixel electrode 472a has the planar state so that the cholesteric liquid crystal reflects a specific color. In addition, if the voltage difference V is higher than the first and second threshold voltages Vth1a and Vth2a and lower than the third threshold voltage Vth3a, the cholesteric liquid crystal on the first and second portions 473a and 474a has the homeotropic state so that the cholesteric liquid crystal expresses the black gray scale, and the cholesteric liquid crystal on the third pixel electrode 472a has the planar state so that the cholesteric liquid crystal reflects a specific color. Further, if the voltage difference V is higher than the first, second, and third threshold voltages Vth1a, Vth2a, and Vth3a, the cholesteric liquid crystal on the first and second portions 473a and 474a and the third pixel electrode 472a has the homeotropic state so that the cholesteric liquid crystal expresses the black gray scale.

Accordingly, a pixel including the first and third pixel electrodes 471a and 472a may express four gray scales.

The third and fourth portions 473b and 474b of the second pixel electrode 471b and the fourth pixel electrode 472b may operate similarly to the above-described portions and pixel electrodes. If the area ratio among the first, second, third, and fourth pixel electrodes 471a, 471b, 472a, and 472b is set to approximately 2:8:1:4, the area ratio between the first and second portions 473a and 474a is set to approximately 1:1, and the area ratio between the third and fourth portions 473b and 474b is set to approximately 1:1. Consequently, the pixel including the first, second, third, and fourth pixel electrodes 471a, 471b, 472a, and 472b may express 16 gray scales. In other words, the area ratio among the first portion 473a, the second portion 474a, the third pixel electrode 472a, the third portion 473b, the fourth portion 474b, and the fourth pixel electrode 472b is set to approximately 1:1:1:4:4:4 so that the pixel shown in FIG. 9 may express 16 gray scales, which is shown in Table 1.

TABLE 1

| | Electrode | | | | | |
|---|---|---|---|---|---|---|
| | The first portion | The second portion | The third pixel electrode | The third portion | The fourth portion | The fourth pixel electrode |
| Number of Gray | | | Area ratio → | | | |
| scales ↓ | 1 | 1 | 1 | 4 | 4 | 4 |
| 0 | 0 | 0 | 0 | 0 | 0 | 0 |
| 1 | 1 | 0 | 0 | 0 | 0 | 0 |
| 2 | 1 | 1 | 0 | 0 | 0 | 0 |
| 3 | 1 | 1 | 1 | 0 | 0 | 0 |
| 4 | 0 | 0 | 0 | 4 | 0 | 0 |
| 5 | 1 | 0 | 0 | 4 | 0 | 0 |
| 6 | 1 | 1 | 0 | 4 | 0 | 0 |
| 7 | 1 | 1 | 1 | 4 | 0 | 0 |
| 8 | 0 | 0 | 0 | 4 | 4 | 0 |
| 9 | 1 | 0 | 0 | 4 | 4 | 0 |
| 10 | 1 | 1 | 0 | 4 | 4 | 0 |
| 11 | 1 | 1 | 1 | 4 | 4 | 0 |
| 12 | 0 | 0 | 0 | 4 | 4 | 4 |
| 13 | 1 | 0 | 0 | 4 | 4 | 4 |
| 14 | 1 | 1 | 0 | 4 | 4 | 4 |
| 15 | 1 | 1 | 1 | 4 | 4 | 4 |

Referring to FIG. 9, FIG. 10, and FIG. 11, the thickness of the liquid crystal layer 180 interposed between the first and second substrates 401 and 102 is adjusted by using the first and second drain electrodes 125a and 125b and the first and second coupling electrodes 430a and 430b. Alternatively or in combination with the first and second drain electrodes 125a and 125b and the first and second coupling electrodes 430a and 430b, the thickness of the liquid crystal layer 180 can be adjusted by adjusting the thickness of the organic insulating layer 160, the protective layer 150, or the common electrode 191.

In addition, although only one step difference area is formed on the first and second pixel electrodes 471a and 471b in FIG. 9, FIG. 10, and FIG. 11, at least two step difference areas may be formed on the first and second pixel electrodes 471a and 471b, respectively, by adjusting the first coupling electrode 430a, the first drain electrode 125a, or the organic insulating layer 160.

For instance, two step difference areas may be formed in the first and second pixel electrodes 471a and 471b to divide the first and second pixel electrodes 471a and 471b into three portions, respectively. In this case, if the area ratio among the first, second, third, and fourth pixel electrodes 471a, 471b, 472a, and 472b is set to approximately 3:15:1:5, the area ratio among the first, second, and third portions of the first pixel electrode 471a is set to approximately 1:1:1, and the area ratio among the first, second, and third portions of the second pixel electrode 471b is set to approximately 1:1:1. Consequently, the pixel including the first, second, third, and fourth pixel electrodes 471a, 471b, 472a, and 472b may express 25 gray scales.

In addition, although the first and second step difference areas SDA3 and SDA4 are formed in the first and second pixel electrodes 471a and 471b, respectively, in FIG. 9, FIG. 10, and FIG. 11, the first and second step difference areas SDA3 and SDA4 may be formed in the third and fourth pixel electrodes 472a and 472b.

Further, although the cholesteric liquid crystal layer is used as the liquid crystal layer 180 of the display panel in the above exemplary embodiment, a bistable liquid crystal layer may be used as the liquid crystal layer 180 in a similar or same way.

In addition, although the pixel includes two transistors connected to two data lines and two pixel electrodes connected to the two transistors, respectively, the number of transistors and pixel electrodes or the number of data lines and gate lines connected to the transistors may vary depending on the number of gray scales required for the display apparatus.

Moreover, although specific area ratios are described above, various area ratios of the pixel electrode and portions of the pixel electrode may occur.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display panel, comprising:
   a first substrate comprising a plurality of pixels, each of the pixels comprising at least one gray scale expression unit to express at least two gray scales;
   a second substrate facing the first substrate; and
   a liquid crystal layer interposed between the first substrate and the second substrate and subject to a phase transition depending on a voltage generated in relation to the gray scale expression unit,
   wherein the gray scale expression unit comprises:
      a data line;
      a gate line crossing the data line and insulated from the data line;
      a switching device connected to the data line and the gate line;
      a first pixel electrode connected to the switching device;
      at least one coupling capacitor connected in parallel to the first pixel electrode; and
      at least one second pixel electrode connected to the first pixel electrode in parallel through the coupling capacitor, and
   wherein the coupling capacitor comprises a first electrode connected to the first pixel electrode and a second electrode connected to the second pixel electrode through a contact hole.

2. The display panel of claim 1, wherein a plurality of the gray scale expression units is provided in which an area of pixel electrodes belonging to one gray scale expression unit is different from an area of pixel electrodes belonging to another gray scale expression unit.

3. The display panel of claim 1, wherein the switching device comprises a drain electrode connected to the first pixel electrode, and the first electrode of the coupling capacitor extends from the drain electrode.

4. The display panel of claim 1, wherein the first electrode of the coupling capacitor is integrally formed with the first pixel electrode.

5. The display panel of claim 1, wherein the liquid crystal layer comprises one of a cholesteric liquid crystal layer, a nemoptic liquid crystal layer, a bistable twisted nematic liquid crystal layer, a three-terminal bistable twisted nematic liquid crystal layer, a bistable chiral splay nematic liquid crystal layer, and a bistable bend splay liquid crystal layer.

6. The display panel of claim 1, wherein the first pixel electrode is divided into a first portion to an $n^{th}$ portion, n being a natural number not less than 2, and a first thickness of the liquid crystal layer, which is a thickness of the liquid crystal layer interposed between the first portion and the second substrate, is different from an $n^{th}$ thickness of the liquid crystal layer, which is a thickness of the liquid crystal layer interposed between the $n^{th}$ portion and the second substrate.

7. The display panel of claim 6, wherein the second pixel electrode is divided into a first portion to an $m^{th}$ portion, m being a natural number not less than 2, and the first thickness of the liquid crystal layer is different from an $m^{th}$ thickness of the liquid crystal layer, which is the thickness of the liquid crystal layer interposed between the $m^{th}$ portion and the second substrate.

8. A display panel, comprising:
   a first substrate comprising a plurality of pixels;
   a second substrate facing the first substrate; and
   a liquid crystal layer interposed between the first substrate and the second substrate and subject to a phase transition depending on a voltage generated in relation to the pixels,
   wherein each pixel comprises:
      a first data line and a second data line;
      a gate line crossing the first data line and the second data line and insulated from the first data line and the second data line;
      a first switching device connected to the first data line and the gate line;
      a second switching device connected to the second data line and the gate line;
      a first pixel electrode connected to the first switching device;
      a second pixel electrode connected to the second switching device;

a first coupling capacitor connected to the first switching device in parallel with the first pixel electrode;

a second coupling capacitor connected to the second switching device in parallel with the second pixel electrode;

a third pixel electrode connected to the first pixel electrode in parallel through the first coupling capacitor; and a fourth pixel electrode connected to the second pixel electrode in parallel through the second coupling capacitor.

9. The display panel of claim 8, wherein the liquid crystal layer comprises one of a cholesteric liquid crystal layer, a nemoptic liquid crystal layer, a bistable twisted nematic liquid crystal layer, a three-terminal bistable twisted nematic liquid crystal layer, a bistable chiral splay nematic liquid crystal layer, and a bistable bend splay liquid crystal layer.

10. The display panel of claim 8, wherein an area ratio among the first pixel electrode, the second pixel electrode, the third pixel electrode, and the fourth pixel electrode is approximately 1:3:1:3.

11. The display panel of claim 8, wherein each of the first pixel electrode and the second pixel electrode is divided into a first portion and a second portion, and a first thickness of the liquid crystal layer, which is a thickness of the liquid crystal layer interposed between the first portion and the second substrate, is different from a second thickness of the liquid crystal layer, which is a thickness of the liquid crystal layer interposed between the second portion and the second substrate.

12. The display panel of claim 11, wherein an area ratio among the first pixel electrode, the second pixel electrode, the third pixel electrode, and the fourth pixel electrode is approximately 2:8:1:4.

13. The display panel of claim 12, wherein an area ratio between the first portion and the second portion of the first pixel electrode and the second pixel electrode is approximately 1:1.

14. The display panel of claim 8, wherein each of the third and fourth pixel electrodes is divided into a third portion and a fourth portion, and a third thickness, which is a thickness of the liquid crystal layer interposed between the third portion and the second substrate, is different from a fourth thickness, which is a thickness of the liquid crystal layer interposed between the fourth portion and the second substrate.

15. The display panel of claim 8, wherein each of the first pixel electrode and the second pixel electrode is divided into a first portion, a second portion, and a third portion, and wherein a first thickness of the liquid crystal layer, which is a thickness of the liquid crystal layer interposed between the first portion and a common electrode, a second thickness of the liquid crystal layer, which is a thickness of the liquid crystal layer interposed between the second portion and the common electrode, and a third thickness of the liquid crystal layer, which is a thickness of the liquid crystal layer interposed between the third portion and the common electrode, are different from each other.

16. The display panel of claim 15, wherein an area ratio among the first pixel electrode, the second pixel electrode, the third pixel electrode, and the fourth pixel electrode is approximately 3:15:1:5.

17. The display panel of claim 16, wherein an area ratio among the first portion, the second portion, and the third portion of the first pixel electrode and the second pixel electrode is approximately 1:1:1.

* * * * *